United States Patent Office 3,451,609
Patented June 24, 1969

3,451,609
HEAT SHRINKABLE PLASTIC SOLDERING SLEEVE
Glenn D. Gillett, Los Altos, Calif., assignor, by mesne assignments, to the United States of America as represented by the Secretary of the Air Force
Filed Aug. 24, 1967, Ser. No. 663,174
Int. Cl. B23k 35/14, 35/20
U.S. Cl. 228—56      3 Claims

ABSTRACT OF THE DISCLOSURE

An improved heat shrinkable plastic soldering sleeve having an observable heat detecting means for determining that the plastic soldering sleeve has been applied under predetermined temperature conditions. The improved plastic soldering sleeve comprises a heat shrinkable plastic tube of sufficient width and length suitable for application to a cable or wire and a circular band of solder located within the central interior portion of the plastic tube. The heat detecting means comprises a conventional heat sensitive paint either applied as a coating to the interior surface of the soldering sleeve or alternatively incorporated within the body of the heat shrinkable plastic tube.

---

This invention relates to an improved heat shrinkable plastic soldering sleeve. More particularly, this invention concerns itself with an improved heat shrinkable plastic soldering sleeve characterized by having an observable temperature indicating means.

Heat shrinkable plastic soldering sleeves for effecting a soldered joint are well known and generally comprise a heat shrinkable plastic tube of a length and diameter sufficient for application to a cable or wire. Generally, there is an internal circular band of solder and flux positioned within the central portion of the plastic tube. These sleeves are frequently employed to fasten and solder a wire or braided wire sleeve to the shield of multi-conductor twisted wire cable. Prior to the application of the sleeve to the shield for the purpose of effecting a soldered joint, the plastic insulation enclosing the cable shield is removed. The soldering sleeve is then threaded onto the cable where it surrounds and covers the section of shield from which the insulation has been removed. At this point either the end of a wire or a metallic braided sleeve is slipped inside the plastic sleeve over the bare section of the cable shield. Heat is then applied to the soldering sleeve in a conventional manner. For example, a stream of very hot air from a heat gun may be applied to the soldering sleeve to induce shrinkage so that the sleeve seals itself to the insulation covering the cable or wire. Further application of heat from the heat gun causes the solder band to melt and flow about the wire and the metallic sleeve to establish a low resistance permanent electrical connection therebetween.

The use of soldering sleeves has proved to be extremely effective in creating proper soldered joints. However, serious drawbacks are often encountered during their use because it is oftentimes difficult for the operator to observe whether he has applied sufficient heat to properly melt and flow the solder. Very often, the application of excessive heat not only melts the solder, but also raises its temperature to the point where the insulation on the soldered wires is softened and the separate wires are forced together by the shrinking of the plastic sleeve to where they are shorted or so close together that they later make contact resulting in an operational failure.

In accordance with the present invention, however, it has been found that the aforementioned difficulties encountered by operators utilizing conventional heat shrinkable plastic soldering sleeves can be eliminated by incorporating a temperature indicator within the sleeve itself to enable the operators to determine immediately whether the proper amount of heat has been applied under the particular circumstances of the operation.

Accordingly, the primary object of this invention is to provide for an improved heat shrinkable plastic soldering sleeve.

Another object of this invention is to provide an improved heat shrinkable plastic soldering sleeve which is characterized by having an observable temperature indicating means incorporated within the sleeve itself.

Still another object of this invention is to provide for a means which facilitates the installation of heat shrinkable plastic soldering sleeve by preventing damage to wires being soldered together from the effects of overheating of the soldering sleeve during installation.

A further object of this invention is to provide a means for effecting a soldered joint through the utilization of the heat shrinkable plastic soldering sleeve whereby quality control inspection is facilitated with a permanent record of the applied temperature being made during the installation of the plastic soldering sleeve.

The above and still further objects, advantages and features of this invention will become readily apparent upon consideration of the following detailed description thereof taken in conjunction with the accompanying drawings. It is to be understood, however, that the drawings present illustrative embodiments of the invention only and are not to be construed as limiting the scope of the invention in any way. In the drawings, like reference numerals denote similar elements in the several views.

Figure 1:
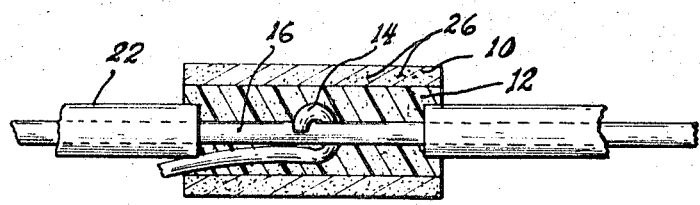
FIGURE 1 is an isometric view, partly in section, showing an end of a lead wire that is to be soldered to the connecting wire of an electrical component.

Referring now to the drawings, there is shown a heat shrinkable plastic soldering sleeve which comprises a heat shrinkable plastic tube 10 of convenient length and diameter. Within the center of the plastic tube 10 is a circular band of solder 12. Any conventional solder and flux may be employed. Suitable solders which have been found suitable are those close to eutectic in composition which melt at about 375° F. Prior to a soldering operation, the sleeve is positioned in order to effect a soldered joint between the end and of a wire 14 and a length of wire 16, as shown in FIGURE 1.

Figure 2:
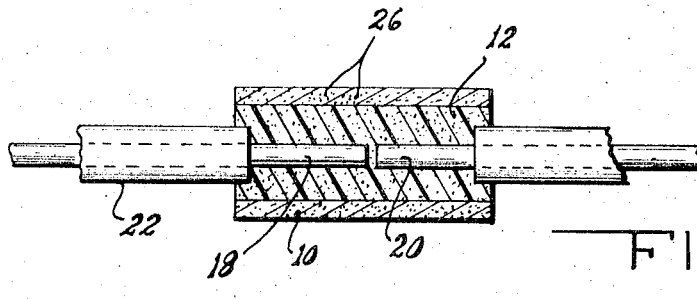
FIGURE 2 is an isometric view, partly in section, showing an alternative embodiment of this invention in which two end wires are butted together prior to soldering.
Figure 3:
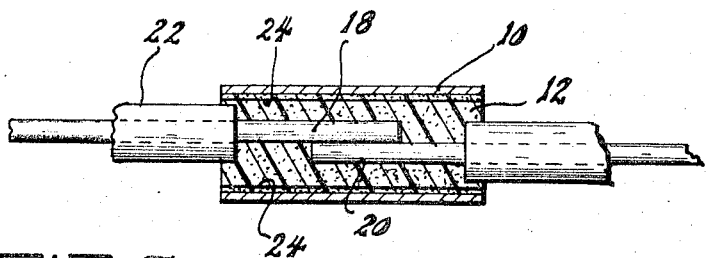
FIGURE 3 is an isometric view, partly in section, showing two end wires in an overlapping relationship prior to being soldered.

The plastic soldering sleeve may also be conveniently utilized to effect a soldered joint between two end wires 18 and 20 butted together, as shown in FIGURE 2, or overlapped as shown in FIGURE 3. The insulation 22 covering the wires 18 and 20 which are about to be soldered is removed prior to the application of the soldering sleeve. The soldering sleeve not only surrounds the wires which are about to be soldered together, but also covers a portion of the insulation 22 covering the wires 18 and 20. Upon the application of heat, the plastic 10 shrinks and seals itself to the insulation 22 over the wires. The additional application of heat then causes the solder band 12 to melt and flow about the wires 18 and 20, thereby establishing a low resistance permanent electrical connection therebetween.

As was stated heretofore, the difficulty of utilizing these plastic sleeves resides in the fact that the operator is unable to ascertain whether sufficient heat has been utilized to produce a proper soldered joint. Too much heat, of course will lead to shorts and resultant failure. Heretofore, there was no simple non-destructive test which could be made to definitely determine any possible damage to the plastic insulation covering the wires 18 and 20 being soldered together unless the damage was so drastic and overheating occurred so quickly that an immediate short was produced.

With the present invention, however, this difficulty has been overcome by providing the heat shrinkable plastic soldering sleeve with a temperature indicating means. In general, the invention consists of incorporating within the heat shrinkable plastic 10 during its formulation a color pigmented paint 26 which changes color when the proper soldering temperature has been reached and again changes to another color at the safe maximum temperature for the wire insulation beneath the soldered sleeve. If the maximum temperature is exceeded during the soldering operation, it is immediately detected. Dual color heat sensitive pigments of proper temperature readings are commercially available for use with this invention. The colors of the paint are determined by the chemical requirements and temperature range to be indicated. For example, a dual temperature heat sensitive paint manufactured by the H. V. Hardman Co. of Belleville, N.J., has been found particularly useful. The original color of this temperature indicating paint is blue. It changes to yellow at 375° F. and to black at 674° F.

In an alternative embodiment, as shown in FIGURE 3, a clear plastic may be employed for the heat shrinkable plastic tube 10 with a heat sensitive color pigmented paint 24 being applied by painting, spraying or dipping the paint onto the interior surface of the heat shrinkable plastic tube 10.

With the present invention, it now become possible for the operator, or a quality control inspector, to determine by visual or other non-destructive inspection means whether the soldered joint has been overheated with resultant damage to the insulation on the wires being soldered, thereby causing an electrical short. The operator is afforded an immediate, clear and unmistakable indication that a sufficient amount of heat has been applied in order to properly melt the solder or, alternatively, a permanent record that an excessive amount of heat has been applied resulting in probable damage.

This invention makes possible for the first time for quality control inspectors not only to determine from the color of the installed sleeve whether the joint has been heated sufficiently to properly melt and flow the solder to make an adequate joint, but also to determine from the color of the sleeve whether it has been overheated during its application and that hence the insulation of the wires within it have been damaged. Thus, it makes possible immediate verification that a proper joint has been made. Also, of equal importance, it allows for immediate rejection if the joint becomes defective due to overhang.

The improved soldering sleeve of this invention provides a simple and economical means for determining immediately whether a proper soldered joint has been made and likewise provides a permanent record of a defective application.

It will be understood by those skilled in the art to which the present invention pertains that while the devices disclosed herein illustrate preferred embodiments of the invention, modifications and alterations can be made without departing from the spirit and scope thereof and that all such modifications as fall within the scope of the appended claims are intended to be included herein.

What is claimed is:

1. In a heat shrinkable plastic soldering sleeve comprising a heat shrinkable plastic tube of predetermined length and width suitable for application to a solderable joint, and a circular band of solder positioned within the interior portion of the plastic tube the improvement which comprises the addition of an observable heat detection means to the heat shrinkable plastic tube.

2. A heat shrinkable plastic soldering sleeve in accordance with claim 1, wherein the heat detection means comprises a heat sensitive pigment containing paint incorporated throughout the body of the plastic tube.

3. A heat shrinkable plastic soldering sleeve in accordance with claim 1, wherein the heat detection means comprises a heat sensitive pigmented paint applied as a coating to the interior surface of the plastic tube.

References Cited

UNITED STATES PATENTS

| | | | |
|---|---|---|---|
| 3,239,125 | 3/1966 | Sherlock | 228—56 |
| 3,396,894 | 8/1968 | Ellis | 228—56 |
| 3,320,355 | 5/1967 | Booker | 174—84 |

RICHARD H. EANES, JR., Primary Examiner.

U.S. Cl. X.R.

174—84